United States Patent [19]

Bergqvist

[11] 4,366,623

[45] Jan. 4, 1983

[54] ELECTRONIC LENGTH MEASURING DEVICE COMPRISING A MEASURING-TAPE WHICH IS ROLLED UP IN A GAUGING STATION

[76] Inventor: Elon R. V. Bergqvist, Myrbackavägen, Pl. 6246, Kungälv, Sweden, 442 90

[21] Appl. No.: 240,124

[22] Filed: Mar. 5, 1981

[30] Foreign Application Priority Data

Mar. 6, 1980 [SE] Sweden ............................... 8001753

[51] Int. Cl.$^3$ ......................... G01B 3/08; G06M 1/272
[52] U.S. Cl. ..................................................... 33/140
[58] Field of Search ................ 33/140, 126.6, 126.7 A

[56] References Cited

U.S. PATENT DOCUMENTS 4,161,781 7/1979 Hildebrandt et al. ............... 33/140
4,195,348 3/1980 Kakutani ............................. 33/140

*Primary Examiner*—Steven L. Stephan
*Attorney, Agent, or Firm*—Holman & Stern

[57] ABSTRACT

The invention refers to an electronic length measuring device by which elongated articles as for example planks (5) can be easily measured and the total cost of which can be easily calculated. The invention substantially comprises a measuring tape which can be pulled out from the gauging station (1), and at the free end of which an operating device (3) is arranged. The measuring tape (2) is provided with a number of detectable elements (11) arranged along the measuring tape (2) at equal distances from each other. The detectable elements (11) are detected by a detector (8) arranged in the gauging station (1), the signals of which are supplied to an electronic unit. The operating device (3) is furthermore provided with at least one switch (15) by means of which the operator is able to initiate the electronic unit (14) to accumulate measured length values to a memory (22). This memory (22) would be updated each time the switch (15) is manually activated and the value accumulated in the memory (22) is shown on a sum display (20). The electric signals thus generated in the operating device (3) are transmitted by the transmission elements (12,13) which for example can consist of electric conductors to the gauging station (1) and the electronic unit (14), said electric conductors being arranged in the measuring tape (2).

3 Claims, 3 Drawing Figures

ELECTRONIC LENGTH MEASURING DEVICE COMPRISING A MEASURING-TAPE WHICH IS ROLLED UP IN A GAUGING STATION

BACKGROUND OF THE INVENTION

The present invention refers to an electronic length measuring device, especially intended for measuring and summation of lengths of wood- or steel goods, comprising a measuring tape which is rolled up in a gauging station.

At retail sale of for example wood-products the lengths of the wood-products are measured with the assistance of conventional folding rules, measuring-tapes or some kind of measuring-planks. The lengths of the wood-products are thereafter summed up by hand or with the assistance of a mechanical or an electronical calculator. This procedure is of course time-wasting and there is a great risk of getting incorrect readings and incorrect summations.

In recent years more automatically working length measuring devices have been development. Such a length measuring device is described in for example the DE-OS No. 2.826.030. This publication shows a measuring equipment in which an extensible measuring-tape is included and with such an equipment different lengths can be measured. The measuring-tape is provided with perforations which engage a gear wheel. The gear wheel is arranged at the end of an axle on the opposite end of which a rotary disk is mounted. The disk is provided with a number of holes arranged in a circle near the periphery of the disk. A detecting-device is arranged to detect the number of holes that passes through the detecting-device.

The thus demonstrated testing-device is suffering from several disadvantages. One disadvantage is that when measuring wood-products, as planks and other long articles, the operator first manually has to unwind the measuring-tape to the full length of the measuring object, thereafter go back to the measuring equipment and initiate a measuring instruction to the electronics by pushing a switch. This procedure must than be repeated for every measuring object. This results in a slow measuring procedure and compared to a conventional measuring system no time saving to speak of is obtained. Furthermore no automatic summation is obtained in a case when a number of measuring objects are to be measured and summed up, which often is the case when wood-articles and the like is measured. An additional disadvantage is the problem of at which direction the tape is running at the different measuring occasions. This has not either been satisfactory solved, which means that incorrect readings can occur if the operator, when measuring the length, allows the tape to move in and out at the same measurement occasion.

SUMMARY OF THE INVENTION

The object of the present invention is to eliminate the above mentioned disadvantages and to provide a length measuring device that is simple to handle and which eliminates several working moments when measuring for example wood articles. This has according to the invention been achieved by the fact that an operating device is arranged at the free end of the measuring tape, that the measuring tape is provided with detectable elements arranged along the measuring tape at an equal distance from each other, that a detector is arranged to automatically detect the detectable elements located in the measuring tape, that transmission means are arranged to transmit electric signals between the operating device and an electronic unit, arranged in the gauging station, so that measured length values are accumulated to a memory arranged in the electronic unit at manual initiation of a switch arranged at the operating device.

BRIEF DESCRIPTION OF THE DRAWINGS

A preferred embodiment of the invention will below be described with reference to the attached drawings.

DESCRIPTION OF A PREFERRED EMBODIMENT

Figure 1:
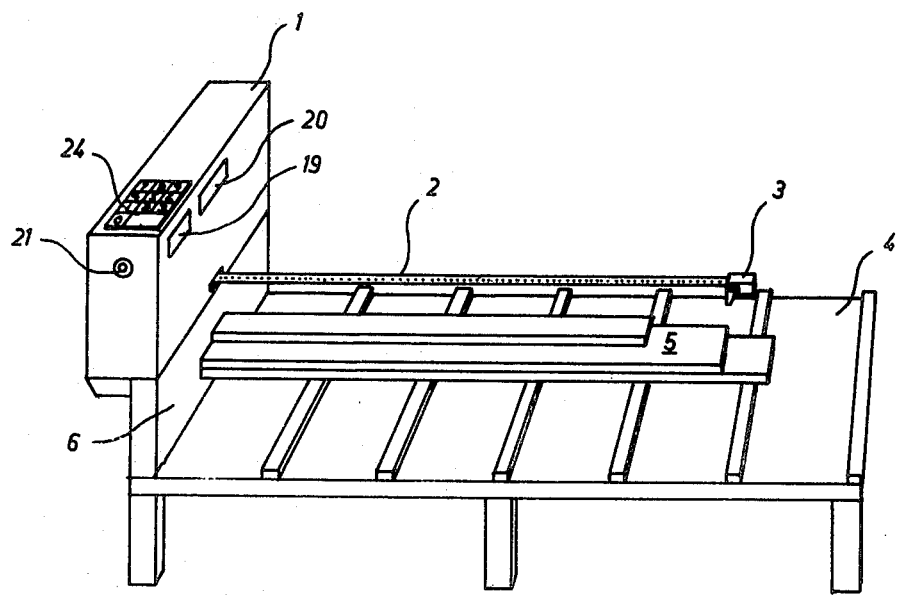
FIG. 1 is a view of the measuring device located at a measuring table.

In FIG. 1 a length measuring device according to the invention is shown mainly comprising a gauging station 1, a measuring tape 2 and an operating device 3. The length measuring device is preferably located on or beside a measuring table 4, designed for elongated objects such as planks 5 and the like. The gauging station 1 is preferably mounted in connection to a ledge 6 at one end of the measuring table 4.

Figure 2:
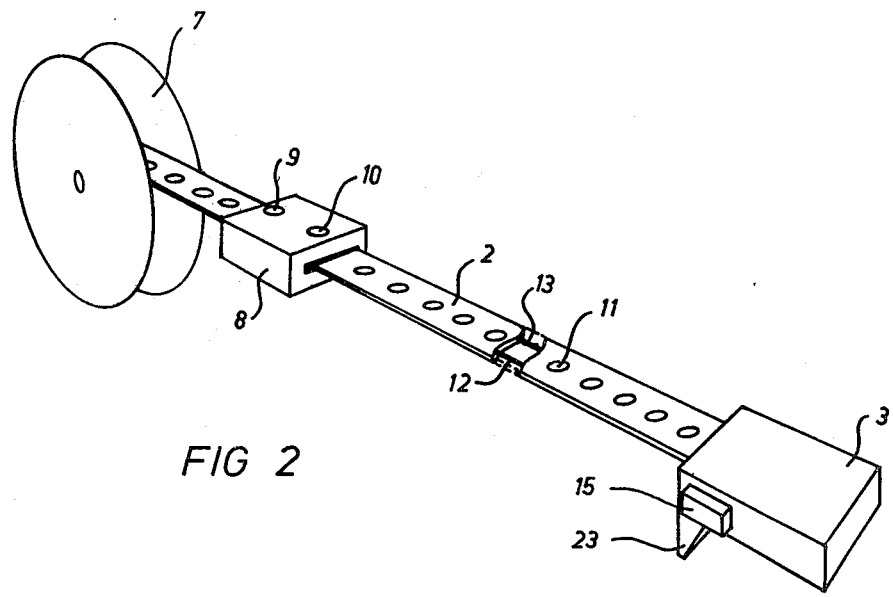
FIG. 2 is a view of the most important mechanical parts of the length measuring device.

FIG. 2 shows the measuring tape 2 partly rolled up on a wind-up drum 7. The drum is spring-loaded (not shown) so that the tape will roll up again when the tape has been drawn-out and than is released. An operating device 3 is arranged at the opposite free end of the measuring tape 2. On the way from the collect drum 7 the measuring tape 2 is running through a detector 8. Detectable elements arranged in the measuring tape 2 are detected by means of two sensors 9,10 arranged in the detector 8. The detectable elements 11 preferably comprise perforations arranged along the measuring tape 2 at equal distances from each other, for example 1 cm. The detectable elements 11 can of course be designed in other ways, for example by optical markings or by small magnets included in the measuring tape 2. Dependent on which type of detectable elements 11 that are used the sensor elements 9,10 are adapted, so that a confident detection of each detectable element 11 is obtained. In cases where the detectable elements 11 are perforations the sensors 9,10 preferably comprise light sensitized photo-transistors arranged in the detector 8 on the top of the measuring tape 2. Some kind of light source, for example light emitting diodes (not shown), are arranged in the detector 8 below the measuring tape 2. The sensors 9,10 are arranged at a distance from each other of 1.5 times the distance between the detectable elements 11 in the measuring tape 2. When the measuring tape 2 is moved out or in, two pulse trains 90° out of phase from each other are generated from the sensors 9,10. The phase sequense will thereby indicate whether the measuring tape 2 is moving into or out of the gauging station 1.

The measuring equipment is also provided with a transmission element 12,13 for transmitting signals generated in the operating device 3. The transmission element 12,13 can for example consist of electric conductors arranged in the measuring tape 2 arranged either on one side of the measuring tape 2 or included in the measuring tape 2. These electric conductors 12,13 connect the electronic circuits 14 arranged in the gauging station 1, with the operating device 3 arranged in the free end of the measuring tape 2. The operating device 3 is provided with at least one switch 15, which by manual influence generates a signal which is transmitted by the conductors 12,13 to the electronic unit 14 in the gauging station 1. The transmission elements 12,13 can instead of electric conductors comprise transmitter- and receiver units (not shown) for wireless transmission. Consequently a transmitter unit is arranged in the operating device 3 and a receiver unit in the gauging station 1 for transmission of signals from the operating device 3 to the gauging station 1. The transmitter- and receiver units could be arranged for transmission of supersonic signals, infralight signals or electromagnetic signals.

Figure 3:
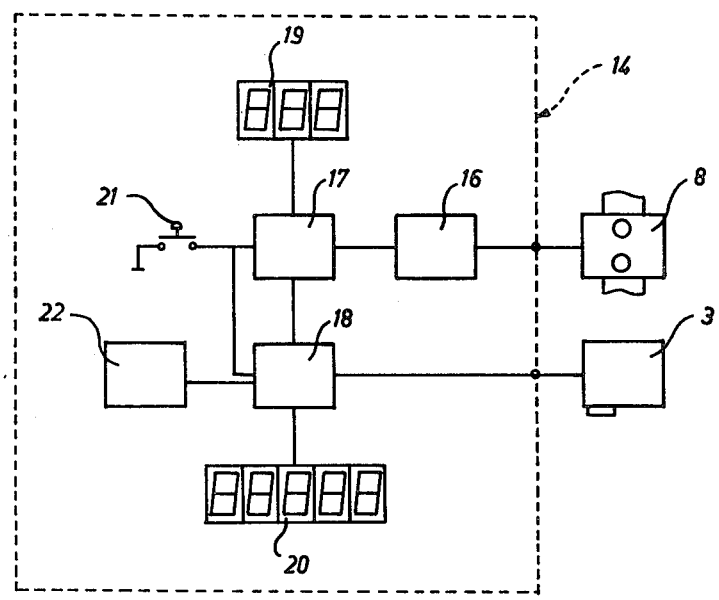
FIG. 3 is a block diagram of the electronics of the length measuring device.

In FIG. 3 a possible design of the electronic unit 14 is illustrated, the construction of which mainly is of conventional type and therefore here only is described in the form of a block diagram. The electronic unit is here illustrated in four electronic blocks and two display blocks where a first block consists of a detector 16, a second block consists of a forward-back-calculator 17, a third block consists of an summation unit 18, together with a fourth block, which is a memory 22. The results of the measurings and calculations are partly shown on a measure display 19, and partly on a sum display 20. A switch 21 for setting to zero is partly connected to the forward-back-calculator 17 and partly to the summation unit 18. From the detector 8 electric signals are transmitted in the form of a pulse train, which is generated when the measuring tape 2 is displaced into or out of the gauging station 1 to the detector 16. The detector 16 is furthermore in electric connection with the forward-back-calculator 17. The forward-back-calculator 17 is in electric connection both with the measure display 19 and with the summation unit 18. The summation unit 18 is in connection with the sum display 20, the switch 21 for setting to zero and with the operating device 3, by the two electric conductors 12,13 arranged in the measuring tape 2 and a rotatable cable in the centre of the drum 7 (not shown).

Function

When articles like elongated wood articles of different kinds are to be measured by means of the present invention the articles are arranged at the measure table 4 and so adjusted that their ends are in close contact with the ledge 6. The gauging station 1 is so arranged that the measuring tape 2 can be drawn out and run parallel with the measure objects. Before beginning the measuring i.e. before the measuring tape 2 is drawn out of the gauging station 1 the electronic unit 14 is preferably put in a zero position by means of the switch 21. The gauging station 1 does not necessarily have to be located tight with the ledge 6 or the ends of the measure objects 5 but the gauging station 1 can be located for example at a distance from the ends of the measure objects 5, preferably somewhere in longitudinal direction of the measure objects 5. The ledge becomes in this way "floating" i.e. the measure objects 5 do not need to be arranged tight to the gauging station 1.

The measuring tape 2 and with that the operating device 3 is then pulled out to the other, opposite end of the first measure object, at which a marking or a ledge 23 on the operating device 3 is adjusted in level with the end of the measure object. It is now possible to immediately read the length of the measure object on the measure display 19, which best is arranged in the gauging station 1 in such a way that it easily can be read from the free end of the measuring tape 2. If the switch 15 is pushed in this position the measured length value is accumulated in the memory 22 connected to the summation unit 18 and is shown on the sum display 20. The operating device 3 is hereafter moved to the end of the next measure object, where the procedure is repeated. In this way all measure object that have been piled up on the measure table 4 easily can be measured, after which all the length values automatically are added up and shown on the sum display 20. The measure objects 5 do of course, not need to be arranged at a measure table 4 but the invention can be used for measuring any separate measure objects. When all measure objects have been measured one can easily read the total length of the measured objects on the sum display 20.

By providing the gauging station 1 with an additional calculation circuit (not shown) and a key set 24 connected thereto it is for example possible that a standard price, as price per meter, for the respective article can be fed in, at which the gauging station 1 automatically calculates the cost for the measured articles. The thus calculated total price is shown on an additional display (not shown).

The device can also be provided with a number calculator which shows how many times the switch 15 has been pushed.

The invention is of course not limited only to the above described preferred embodiment but several embodiments are possible within the scope of the claims. Thus the measure device can be used for different measure purposes within sports, for example for measuring athletic performances such as long jump, javelin-throwing and so on. An other possible variety is the measuring of vertical distances. For instance when storing pallet loaded goods in so called height stock, i.e. very high shelves with assistance of fork trucks. The collection of a pallet at high heights is a great problem, because it is difficult to see the exact position of the forks and the pallet. By fixing the gauging station according to the invention at the fork truck, and the free end of the measuring tape at the forks and the operating device at the driver's seat in the truck, it is possible by leaving the pallet on the shelf to measure the distance in question, which value will be accumulated in the memory of the gauging station. When the pallet will be collected the fork will be lifted up to the earlier measured value.

I claim:

1. An electronic length measuring device for measuring length and summing successively measured lengths, said device comprising:
   a gauging station;
   an elongated measuring tape having a plurality of detectable elements secured thereto and spaced at equal distances along the length of the tape, said tape having a distal end;
   means for permitting selective longitudinal extension and retraction of said distal end of said tape from said gauging station;
   detector means for sensing passage of said detectable elements thereby during longitudinal extension and retraction of said tape;
   counter means for counting each detectable element sensed by said detector means to provide a count representing a measured length;
   selectively actuable signal transmission means disposed at said distal end of said tape;

means for transmitting signals from said transmission means to said gauging station; and memory means disposed at said gauging station for accumulating counts of said counter means representing successive measured lengths in response to a signal transmitted by said transmission means.

2. The device according to claim 1, wherein said signal transmission means includes manually actuable means for generating signals to be transmitted to said gauging station.

3. The device according to claim 1, wherein said means for transmitting comprises electric conductors secured to and extending lengthwise along said tape.

* * * * *